(12) United States Patent
Vaidya et al.

(10) Patent No.: US 8,613,091 B1
(45) Date of Patent: Dec. 17, 2013

(54) METHOD AND APPARATUS FOR CREATING A SECURE ANYWHERE SYSTEM

(75) Inventors: Vimal Vaidya, Fremont, CA (US); Kurt Lennartsson, Milpitas, CA (US)

(73) Assignee: RedCannon Security, Inc., Newark, CA (US)

( * ) Notice: Subject to any disclaimer, the term of this patent is extended or adjusted under 35 U.S.C. 154(b) by 1905 days.

(21) Appl. No.: 10/796,324

(22) Filed: Mar. 8, 2004

(51) Int. Cl.
*G06F 11/00* (2006.01)
*G06F 13/00* (2006.01)

(52) U.S. Cl.
USPC ............... 726/24; 726/22; 726/23; 726/25; 711/163; 711/164

(58) Field of Classification Search
USPC ............ 726/26, 22, 23, 24, 25; 711/163, 164
See application file for complete search history.

(56) References Cited

U.S. PATENT DOCUMENTS

| | | | | |
|---|---|---|---|---|
| 5,623,637 A * | 4/1997 | Jones et al. | | 711/164 |
| 5,826,012 A * | 10/1998 | Lettvin | | 726/22 |
| 5,826,013 A * | 10/1998 | Nachenberg | | 726/22 |
| 6,021,150 A | 2/2000 | Partio et al. | | |
| 6,038,320 A | 3/2000 | Miller | | |
| H1944 H * | 2/2001 | Cheswick et al. | | 726/11 |
| 6,189,099 B1 * | 2/2001 | Rallis et al. | | 713/172 |
| 6,347,375 B1 * | 2/2002 | Reinert et al. | | 726/24 |
| 6,405,318 B1 | 6/2002 | Rowland | | |
| 6,499,107 B1 | 12/2002 | Gieichauf et al. | | |
| 6,715,084 B2 | 3/2004 | Aaron et al. | | |
| 6,732,301 B1 * | 5/2004 | Landry et al. | | 714/43 |
| 6,775,780 B1 * | 8/2004 | Muttik | | 726/24 |
| 6,925,572 B1 | 8/2005 | Amit et al. | | |
| 7,020,895 B2 * | 3/2006 | Albrecht | | 726/22 |
| 7,032,240 B1 * | 4/2006 | Cronce et al. | | 726/2 |
| 7,178,166 B1 | 2/2007 | Taylor et al. | | |
| 7,197,762 B2 | 3/2007 | Tarquini | | |
| 7,213,766 B2 * | 5/2007 | Ryan et al. | | 235/492 |
| 7,216,366 B1 * | 5/2007 | Raz et al. | | 726/24 |
| 7,272,723 B1 * | 9/2007 | Abbott et al. | | 713/185 |
| 7,320,071 B1 * | 1/2008 | Friedman et al. | | 713/165 |
| 7,591,018 B1 * | 9/2009 | Lee | | 726/24 |
| 7,861,302 B1 * | 12/2010 | Raz et al. | | 726/24 |
| 2002/0035639 A1 | 3/2002 | Xu | | |
| 2002/0100036 A1 | 7/2002 | Moshir et al. | | |
| 2002/0108059 A1 | 8/2002 | Canion et al. | | |
| 2002/0147924 A1 * | 10/2002 | Flyntz | | 713/200 |
| 2002/0162009 A1 * | 10/2002 | Shmueli et al. | | 713/200 |
| 2002/0188872 A1 * | 12/2002 | Willeby | | 713/202 |

(Continued)

OTHER PUBLICATIONS

"U3 Platform," downloaded from www.u3.com/platform/default.aspx on Oct. 27, 2006.

(Continued)

*Primary Examiner* — Teshome Hailu

(57) ABSTRACT

A method and apparatus for providing portable end-point security are provided. In one embodiment, a PEPS system may include a PEPS processor having a memory operatively coupled thereto, the memory having stored therein instructions which when executed by the PEPS processor causes: an automatic loader to automatically trigger loading of the PEPS system; the PEPS system including a malicious software detector to scan a main memory of the computing system for malicious software; and wherein the malicious software detector performs a scan of the main memory of the computing system following triggering of the PEPS system by the automatic loader by comparing existing data in main memory of the computing system with indicia of malicious software.

24 Claims, 15 Drawing Sheets

(56) References Cited

U.S. PATENT DOCUMENTS

| | | | |
|---|---|---|---|
| 2002/0191548 A1* | 12/2002 | Ylonen et al. | 370/254 |
| 2003/0009687 A1* | 1/2003 | Ferchau et al. | 713/200 |
| 2003/0045273 A1 | 3/2003 | Pyhalammi et al. | |
| 2003/0087601 A1 | 5/2003 | Agam et al. | |
| 2003/0093281 A1* | 5/2003 | Geilhufe et al. | 704/275 |
| 2003/0120605 A1* | 6/2003 | Fontana et al. | 705/59 |
| 2003/0167395 A1 | 9/2003 | Chang et al. | |
| 2003/0188189 A1* | 10/2003 | Desai et al. | 713/201 |
| 2003/0212821 A1* | 11/2003 | Gillies et al. | 709/238 |
| 2003/0229890 A1 | 12/2003 | Lau et al. | |
| 2004/0073726 A1 | 4/2004 | Margalit et al. | |
| 2004/0088567 A1* | 5/2004 | Lamotte | 713/200 |
| 2004/0187012 A1* | 9/2004 | Kohiyama et al. | 713/193 |
| 2004/0187018 A1 | 9/2004 | Owen et al. | |
| 2005/0066069 A1* | 3/2005 | Kaji | 710/1 |
| 2005/0102529 A1 | 5/2005 | Buddhikikot et al. | |
| 2005/0156043 A1* | 7/2005 | Lin | 235/441 |
| 2006/0010325 A1 | 1/2006 | Liu et al. | |
| 2006/0015728 A1 | 1/2006 | Ballinger et al. | |
| 2006/0242686 A1* | 10/2006 | Toda et al. | 726/3 |
| 2007/0186099 A1* | 8/2007 | Beck et al. | 713/159 |
| 2008/0046990 A1* | 2/2008 | Narayanaswami et al. | 726/9 |
| 2008/0082183 A1* | 4/2008 | Judge | 700/33 |
| 2008/0082813 A1* | 4/2008 | Chow et al. | 713/2 |
| 2009/0013165 A1* | 1/2009 | Chow et al. | 713/2 |

OTHER PUBLICATIONS

"TCG EFI Platform—for TPM Family 1.1 or 1.2," pp. 1-37, Jun. 2006.
"TCG EFI Protocol—for TMP Family 1.1 or 1.2," pp. 1-18, Jun. 2006.
Stanek, William R., "Microsoft Windows 2000 Administrator's Pocket Consultant," Microsoft Press, Chapter 8—Creating User and Group Accounts in Windows 2000, Jan. 12, 2000.
Securing the Perimeter, Part 1, Symantec Corporation, May 16, 2001.
Wells, Mark, et al, "Defend Your Enterprise With Layered Security," Symantec Corporation, Jun. 14, 2001.
Symantec Enterprise Security Manager 5.5, Symantec Corporation, Dec. 12, 2001.
Symantec AntiVirus Solution 7.5 Tour Part 1, Symantec System Center, Symantec Corporation, Jul. 10, 2001.
Symantec AntiVirus Corporate Edition User Manual, "Symantec AntiVirus Corporate Edition and Realtime Protection," Symantec Corporation, Jul. 2, 2002, pp. 29-35.
AXENT(R)/ESM User Manual Version 5.1, Symantec Corporation, Section 1.5, Oct. 25, 2001.
Symantec AntiVirus Corporate Edition Administrator's Guide, Symantec Corporation, Jul. 2, 2002, pp. 52-53.
Ferguson, Paul, et al., "What is VPN?", Apr. 1998.
News Release: Symantec Announces Norton Utilities for Windows NT 4.0, Symantec Corporation, Jan. 27, 1997.
Applicant's reply to Office Action dated Dec. 22, 2009.
Final Rejection dated Apr. 1, 2010.
Amendment after final dated Jul. 13, 2010.
Notice of Allowance dated Jul. 13, 2010.
Examiner interview summary dated Jul. 13, 2010.
Miscellaneous incoming letter dated Aug. 12, 2010.
Replacement drawings dated Aug. 12, 2010.
Arguments in support of replacement drawings dated Aug. 12, 2010.
Amendment after allowance dated Aug. 12, 2010.
Issue notice dated Aug. 25, 2010.
William R. Stanek; Microsoft Windows 2000 Administrator's Pocket Consultant; Jan. 12, 2000; Microsoft Press; Chapter 8—Creating User and Group Accounts in Windows 2000.
Securing the Perimeter, Part 1; May 16, 2001; Symantec Corporation.
Wells, Mark & Thrower, Wood; Defend Your Enterprise with Layered Security; Jun. 14, 2001; Symantec Corporation.
Symantec Enterprise Security Manager v5.5; Dec. 12, 2001; Symantec Corporation.
Keys that Remember—And a Lot More; BusinessWeek/online, Dec. 22, 2003 pp. 1-2.
You Can Lug Home Your Office Computer Inside Your Pocket, The Wall Street Journal, online, Nov. 20, 2003, pp. 1-3.
USB VPN & Firewall Adapter; LINKSYS, a Division of Cisco Systems, Inc. 2003, pp. 1-3.
Key Computing—Mobility that Works, M-Systems, 2003, pp. 1-4.
Xkey Delivers Mobile Access on Your Key Ring, Channel: Content and Collaboration (Archive), Jan. 15, 2004, p. 1 of 1.
Symantec Antivirus Solution 7.5 Tour Part 1: Symantec System Center; Jul. 10, 2001; Symantec Corporation.
Symantec Antivirus Corporate Edition User Manual Version 5.1; Oct. 25, 2001; Symantec Corporation; pp. 29-35.
AXENT(R)/ESM User Manual Version 5.1; Oct. 25, 2001; Symantec Corporation; Section 1.5.
Symantec Antivirus Corporate Edition Adminstrator's Guide; Jul. 2, 2002, Symantec Corporation, pp. 52-53.
Ed Skoudis, Counter Hack: A Step-by-Step Guide to Computer Attacks and Effective Defenses; Jul. 23, 2001; Prentice Hall PTR, pp. 44-57, 139-140, 226-237, 248-251, 379, 432-433.
Ferguson, Paul & Huston, Geoff; What is a VPN? Apr. 1998.
Non-Final Office U.S. Appl. No. 10/739,552 dated Nov. 2, 2006.
Non-Final Office U.S. Appl. No. 10/739,552 dated May 4, 2007.
Final Rejection U.S. Appl. No. 10/739,552 dated Jan. 17, 2008.
Non-Final Office U.S. Appl. No. 10/739,552 dated Sep. 3, 2008.
Non-Final Office U.S. Appl. No. 10/739,552 dated Aug. 28, 2009.
IDS Statement Aug. 31, 2004.
"Micro Vault with Fingerprint Access," Sony Global—Micro Vault, pp. 1-4, 2004.
"Keys That Rember—And a Lot More," BusinessWeek/online, pp. 1-2, Dec. 22, 2003.
"You Can Lug Home Your Office Computer Inside Your Pocket," The Wall Street Journal, online, pp. 1-3, Nov. 20, 2003.
"USB VPN & Firewall Adapter," LINKSYS, a Division of Cisco Systems, Inc., pp. 1-3, 2003.
"KeyComputing—Mobility that Works," M-Systems, pp. 1-4, 2003.
"Xkey Delivers Mobile Access on Your Key Ring," Channel: Content and Collaboration (Archive), p. 1 of 1, Jan. 15, 2004.

* cited by examiner

METHOD AND APPARATUS FOR CREATING A SECURE ANYWHERE SYSTEM

FIELD OF THE INVENTION

The present invention relates to computer security, and more particularly to securing a computer in an insecure environment.

BACKGROUND

As the Internet became prevalent and accessible from almost anywhere, the choice of connectivity to the Internet grew as well. Corporate boundaries expanded beyond the physical campus network, Roaming employees could connect to the corporate network from almost anywhere using a Virtual Private Network (VPN). An employee could be on his desktop in the office; at home on his home machine; at an airport, a cybercafe, or a hotel room with his laptop; or at a Kiosk computer and he/she could still connect to the corporate network and access emails as well as other useful data.

This extremely powerful connectivity is extremely dangerous. Being able to access emails and corporate data from a Kiosk or a cybercafe is very useful and convenient, however, it has risks. The computer being used is not under the control of the user at all times. The computer or kiosk could monitor the data that comes through. It could include various types of spyware, which logs keystrokes, or interactions. This makes anything and everything an employee does on the network vulnerable to be captured regardless of whether or not VPN is used. Even if the computer is the user's own laptop, if the access point has spyware on it, what the employee does could still be compromised. Furthermore, using the captured data, the entire corporate network may become vulnerable. Even without an active spyware application, by showing what sites a user visited (history) and what cookies were activated, significant amounts of information can be obtained.

Security threats at the end-point computers have been a key issue for many enterprises and computer users. However with the network boundaries disappearing, the threat of inadvertent exposure of the corporate data is greater than ever before. Therefore, a better way of securing data in an environment where the computer or the network is not under the user's control at all times would be advantageous.

SUMMARY OF THE INVENTION

A method and apparatus for portable end-point security.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for creating a secure working environment on a potentially insecure computer is described. The present invention is a portable end-point security (PEPS) device that includes software to establish a secure perimeter. Upon connecting the PEPS to a computer, in one embodiment, the software automatically installs itself on that end-point computer, and creates a secure environment for the user. In one embodiment, the PEPS creates a secure cache within that computer for all temporary user data and facilitates secure authentication and communication with a server, or remote system. In one embodiment, PEPS is implemented in a USB (universal serial bus) key. Alternatively, PEPS may be implemented as an Attachable Hard Drive, PCMCIA (Personal Computer Memory Card International Association) card, a Firewire connection, or any other mechanism that permits the coupling of the portable PEPS to a computer system. In one embodiment, PEPS may be implemented in software using a Java applet, ActiveX, Web application or similar technology.

Figure 1A:
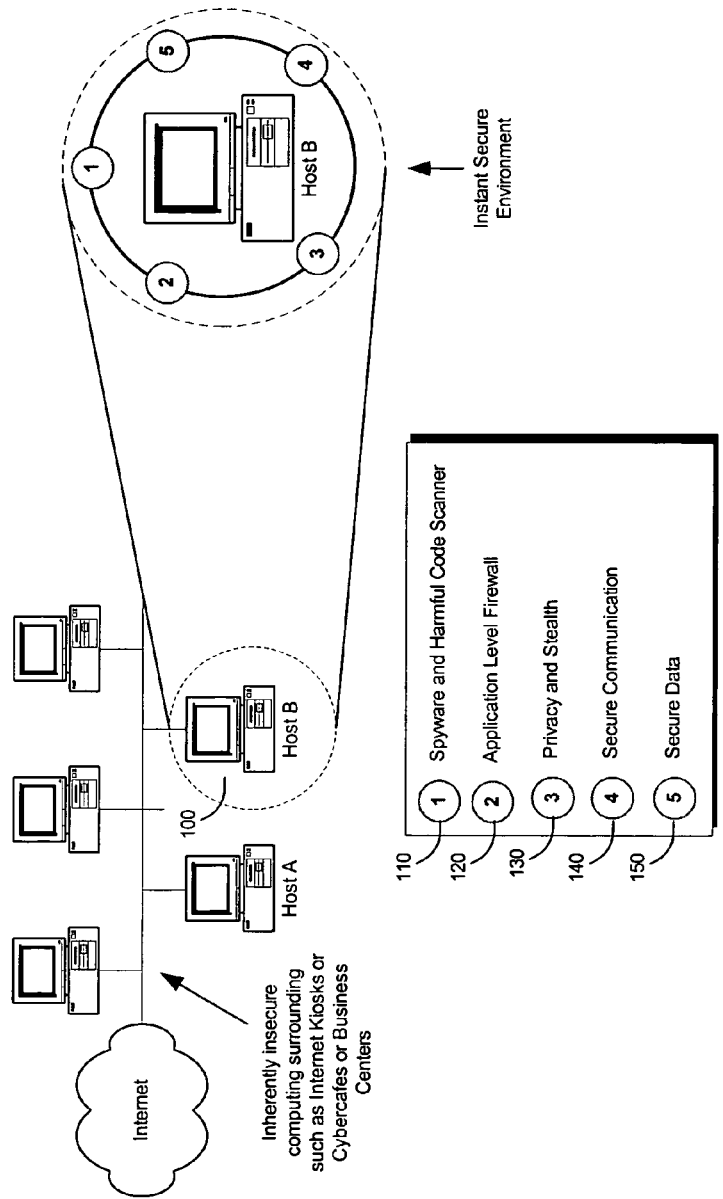
FIG. 1A is a block diagram of a network including a computer system on which a portable end-point security (PEPS) may be used.

FIG. 1A is a block diagram of a network including a computer system on which the PEPS may be used. There are five layers of protection, around Host B 100, the computer into which the PEPS has been inserted.

First the checking for potential spyware takes place (110). After successful check—i.e. no spyware found or spyware removed—the PEPS is authenticated, enabling its use. The user can then select a secured application from the PEPS. Secured applications include, in one embodiment, files in the Vault (secure storage), Browser and Email clients, and other applications available from the PEPS. In one embodiment, any application used with the PEPS can be a secure/stealth application. Secure applications are applications that are uploaded from the PEPS, and are therefore controlled. Stealth applications are applications residing on the PEPS or on the insecure computing system, whose outputs are all redirected to the Secure Cache, including temporary files, so that they leave no traces on the computer. The secure cache can reside on the PEPS or be created on the insecure system under control by the PEPS and will, in the latter case, be securely deleted after the PEPS has been unplugged.

The system further includes an application level firewall (120) that protects communication.

A privacy and stealth system (130) controls cookies, harmful code, and will not leave any trace behind on the computer that has been used. The system ensures that not even temp files are left behind after use. The system can even use the computers own browser for full functionality. The browser is used securely by redirecting anything that leaves traces, such as temp files, temp Internet files, cookies etc to the PEPS. Secure communication (140) comes from using the techniques above in for the Browser in combination with SSL to communicate back to the organization. Secure data (150) is the data that is stored in the Vault on the PEPS.

Figure 1B:
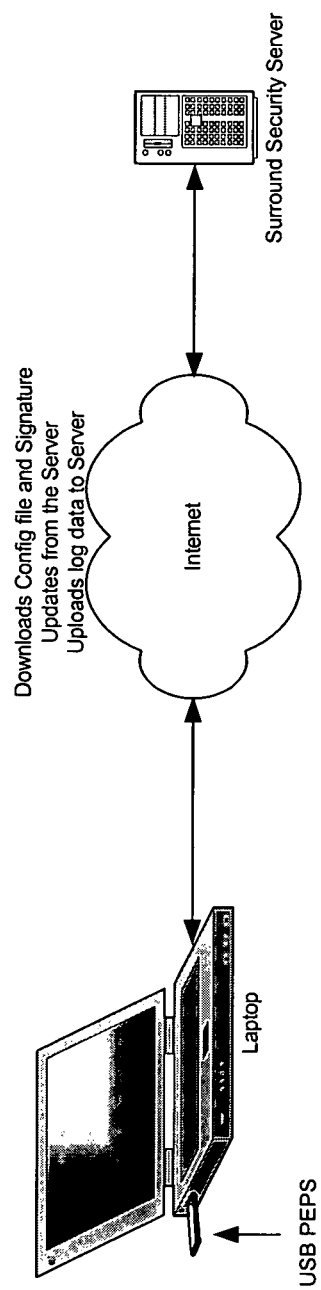
FIG. 1B is a diagram of the interaction of the computing system including PEPS and a server.
Figure 11:
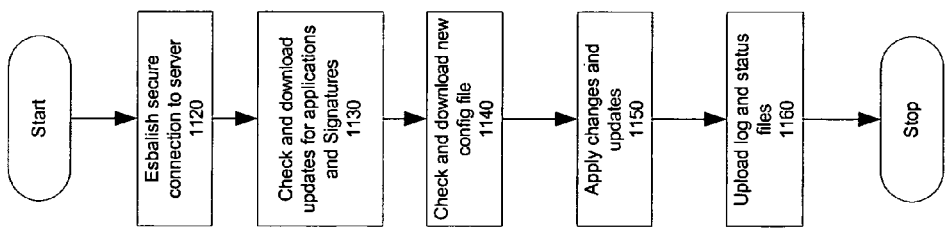
FIG. 11 is a flowchart of one embodiment of interaction between the PEPS and a server.

FIG. 1B illustrates the interaction between the PEPS and the surround security server. The surround security server may be a central server, or may be a server provided by a corporation for its employees. The PEPS connects to the surround security server, and downloads configuration files and signature updates. In one embodiment, the PEPS may also upload log data to the server. This process is described in more detail below with respect to FIG. 11. The process starts when the PEPS wishes to connect to the server for an update. In one embodiment, the PEPS is periodically triggered to connect to the server, if a secure connection is available. In another embodiment, every time the opportunity presents itself, the PEPS connects to the server.

At block 1120, a secure connection is established with the server. In one embodiment, the secure connection is established once the PEPS security is installed, as described below. If Level-1 or Level-2 security is established, and secure shell (SSH), secure sockets layer (SSL), or another secure connectivity method is available, the PEPS can establish a secure connection with the server.

At block 1130, the PEPS check for, and downloads any updates for applications, and malicious software signatures. In one embodiment, a CRC, version number, or similar identifier is used to determine whether the PEPS has the most current information. If it does not, the PEPS downloads the new data from the server.

At block 1140, the PEPS checks for and download a new configuration file, if available.

At block 1150, the PEPS applies the changes and updates. In on embodiment, the PEPS immediately authorizes and implements new policies through connecting to the server and downloading the new policy right after the PEPS is connected to a computer. In one embodiment, this update occurs every time the PEPS is securely connected to a computer system. In one embodiment, in addition to updating its internal settings, the PEPS verifies its current connection using the new data. That is, for example, if an additional malicious software signature was added, the PEPS starts checking for the new signature immediately upon successfully downloading the updated signature file.

At block 1160, the PEPS uploads log and status files. In one embodiment, the PEPS logs the instances of malicious software disabled and connections prohibited, as well as anything else of relevance to blocking. In one embodiment, this data is available to the user, from the server's web site. In another embodiment, the web site collects this data without any user identifying information. In another embodiment, the user may turn off logging.

In one embodiment, the PEPS is centrally managed by an enterprise or the like. For example, a corporation may provide PEPS to its employees, and also provide the server that updates the PEPS and collects log data. In one embodiment, the administrator can review logs and get alarms about Spyware etc. In one embodiment, the administrator may be able to shut down the users SSL connection to the company remotely. Thus, while the system provides security and stealth against outsiders, the administrators of the enterprise system would have access to the logs and other files on the PEPS. In one embodiment, the logs may include, for example, sites visited, etc.

Figure 2:
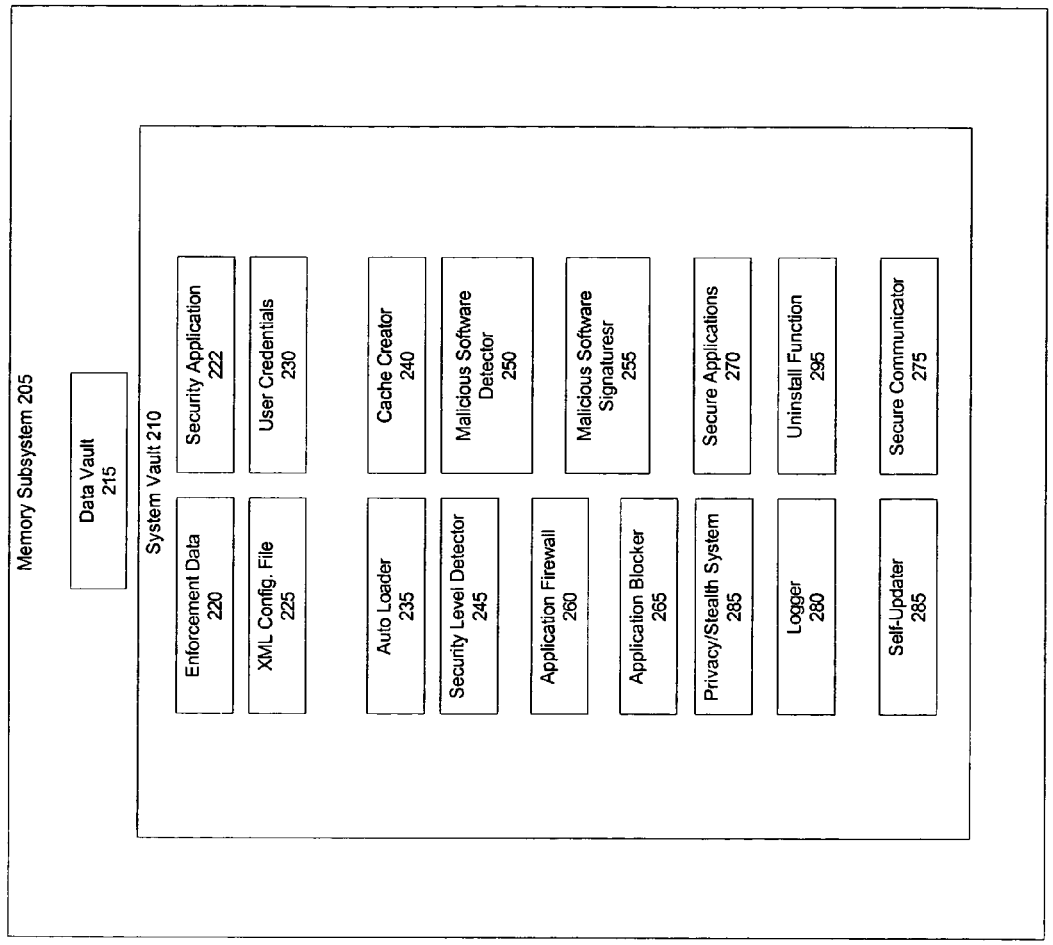
FIG. 2 is a block diagram of the software components of the PEPS 200.

FIG. 2 is a block diagram of the software components of the PEPS 200. In one embodiment, the system has three levels of security which may be invoked. Level 3 permits the user to use the applications available on the system securely, without leaving a trace on the host computer. Level 3 security may be used to keep your privacy on the host computer. In one embodiment, Level 3 security may also include scanning for keyboard loggers and Spyware, getting secure email, using the web and SSL VPN to connect back to the enterprise, etc. All of these features are available without leaving any traces on the host computer. Level 3 security may be used when there is no chance of installing anything on the computer due to limited rights, whether it is a company computer or not. In general, Level 3 security provides no chance of monitoring the user. However, if the PEPS system belongs to an enterprise (or there is an administrator other than the user), the enterprise can obtain traces and data from the logs on the PEPS.

Level 3 provides customized applications, from the PEPS to provide security. However, Level 3 can be implemented without admin rights on the computer system.

Level 2 security provides application control, as well as content filtering and content control mode, using the existing applications on the computer system. Level 2 security, in one embodiment, provides a better filter for the communication, and ensures that any malicious applications and harmful embedded code such as Spyware and ActiveX components are nullified. Level 2 security may further as enforce content filtering and content control such as modifying the cookies (for increased privacy).

Level 2 security provides more extensive filtering of the communication and stops potential Spyware from communicating. Communication requests can be matched to the applications that are authorized to communicate. Content filtering can also be enforced on the browser. In one embodiment, cookie control may modify the content of the cookies for increased privacy. Level 2 security can, in one embodiment, block harmful code, and block advertising as well.

In one embodiment, the memory subsystem 205 on PEPS is split into two primary regions, System Vault 210 and Data Vault 215. This allows the PEPS to handle security of information in a methodical manner.

The system vault 210 is a hidden, non-user-writeable area of memory where the PEPS applications are stored. In one embodiment, a security application 222 is stored along with enforcement data 220 such as configuration file and user credentials. In one embodiment, the PEPS application includes elements in formats such as Java applet, application or a windows DLL. An XML configuration file 225, which carries the corporate policies regarding usage and communication, is stored in the system vault 210 as well. User credentials 230 such as password for installation, password for accessing the Data Vault, password or digital certificate for establishing credentials to a corporate back-end, are stored in the system vault 210 as well. The system vault 210 is for system use only, and requires a manager application to modify or add data.

The data vault 215 is where user specific data is stored. In one embodiment, access to the data vault 215 requires secure password-based authentication. However, in one embodiment, the user can view the listing of files and directories in the data vault 215 once the user is initially authenticated for PEPS installation. In one embodiment, the user would be granted a limited number of attempts to provide the correct password. For example, the number of attempts may be set at three. In one embodiment, the number of attempts permitted may be altered by an administrative user, as will be described below.

After, the number of failures, the system locks out the user. Once the Vault 215 is in this state, in one embodiment, the system uses a data recovery key to access the Vault. The data recovery key, in one embodiment, requires administrative access to reset the Data Vault 215 password. In one embodiment, no one can penetrate the vault once it is locked, without the data recovery key. This provides security in case the PEPS is lost and recovered by a non-trusted third party. In one embodiment, secure remote help may be provided to reset the user password. The PEPS could also be used, in one embodiment, as part of the authentication system to authenticate the user to Windows, at Level-1. In one embodiment, the PEPS could replace a smart card for authentication purposes. In one embodiment, the hooks in Windows to provide third party authentication may be used to provide this service.

Figure 3A:
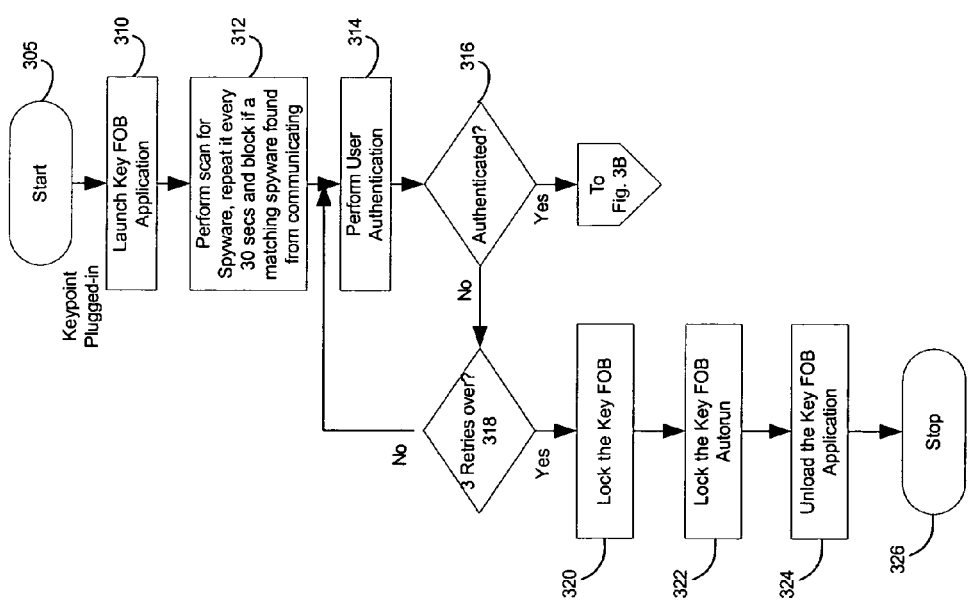
FIGS. 3A and 3B are a flowchart of one embodiment of using the PEPS system.

FIG. 3A is a flowchart of one embodiment of using the PEPS system. The process starts at block 305. At block 310, the PEPS application is launched. In one embodiment, this occurs automatically when the PEPS is coupled to the computer system. The PEPS may be coupled to the computer system physically via USB, Firewire, USB 2.0, PCMCIA, or similar connection. Alternatively, infrared, Bluetooth, wireless, or other connectivity may be used. In one embodiment, the PEPS system is coupled directly to the computer system.

At block 312, the scan for spyware is performed. In one embodiment, this scan is repeated periodically. For example, the spyware scan may be repeated every 30 seconds. The spyware scan is shown in more detail in FIGS. 4 and 5.

At block 314, the process requests user authentication. In one embodiment, authentication requests a user ID and password. Alternately, the authentication may request a password only. Alternative means of authentication, known in the art, may be used.

At block 316, the process determines if the authentication was successful. If the authentication is successful, the process continues to block 330. Otherwise, the process continues to block 318, to determine whether there have been three unsuccessful attempts at authentication. In one embodiment, the user gets three opportunities to correctly authenticate to the PEPS. In one embodiment, the user, when setting up the PEPS, can set a number of tries available. In another embodiment, another number of tries may be set by the system.

If the number of tries available have not been used, the process returns to block 314, to again request user authentication information.

If the number of retries has been exhausted, the process continues to block 320.

At block 320, the PEPS is locked. In one embodiment, the PEPS can subsequently be unlocked by someone with administrative rights, on a secured computer system. In another embodiment, secure Remote Help provided by the administrator may be used to unlock the PEPS, or reset the users password. In one embodiment, only a preset number of remote unlock attempts are permitted. At block 322, the PEPS autorun is locked. The autorun is the automatic launch enabler, which automatically launches the PEPS application when the PEPS is coupled to a computing system. At block 324, the portions of the PEPS applications that were added to the computer system are unloaded, to leave a pristine computer system, without any evidence of the PEPS. The process then ends at block 326.

If, at block 316, the user was successfully authenticated, the process continued to block 330. At block 330, the process determines whether the computer system has a surround security application installed. In one embodiment, the system determines whether the Fireball Surround Security Application™ manufactured by RedCannon, the assignee of the present application, is installed. A description of a system that may be the underlying security application on the computer system is described in co-pending application U.S. Ser. No. 10/739,552, filed Dec. 17, 2003, entitled "A Method And Apparatus To Secure A Computing Environment", assigned to the assignee of the present application. That application is incorporated herein by reference. In another embodiment, the process determines whether an operating system is installed that enables full surround security installation from the PEPS. If so, the process continues to block 332, as if the Fireball Surround Security Application™ were installed on the system.

If the surround security application is installed, the process continues to block 332. This, described as Level-1, provides the highest level of protection and functionality for the user. Since the surround security system is enabled, the user can be sure that the computer system is secure and fully functional.

At block 332, the functions of the PEPS are disabled, except for the Vault. The security applications that would be provided by PEPS are instead run on the underlying surround security system. At block 334, the surround security manager application is notified that the PEPS has been plugged in.

At block 336, the vault explorer is launched. The vault explorer is described in more detail in FIG. 6, below. The user is then able to use the system.

The system continues to monitor, to determine whether the user has unplugged the PEPS, block 338. If so, the process continues to the unloading stage. The unloading process is described in FIG. 9, below.

The system furthermore continues to monitor for user commands, block 340. If a user command is issued, the process continues to block 341. At block 341, the process executes the command/action. These actions may include encryption/decryption of files, opening files, etc. The process then returns to block 338, to monitor whether the user has unplugged the PEPS.

If, at block 330, the process did not find the surround security system installed, the process continues to block 342.

At block 342, the process determines whether the user has administrative rights on the computer system. Administrative rights enable the user to install applications on the computer. If administrative rights are available, the process continues to block 344. This level of security is designated Level-2, indicating an intermediate level of security. All of the security features available with Level-1 are installed, except the network layer firewall and intrusion detection system, since these require a reboot and most of the time that is not an option available on public computers. In another embodiment, if the operating system permits Level-1 security even without the preinstalled system, the Level-2 security may be selected because of user preference or speed considerations.

At block 344, the PEPS Enforce DLL is installed.

At block 346, the application firewall is initialized. At block 348, the cookie control and content filter is initialized. At block 350, the harmful code filter is initialized. At block 352, the enforcement mechanism is installed. In one embodiment, the enforcement mechanism is a dynamically linked library (DLL). These methods are described in more detail in co-pending application Ser. No. 10/739,552, incorporated by reference.

The process then continues to block 336, and the vault explorer is launched.

If, at block 342, the process determined that no administrative rights were available—i.e. the system is not permitted to install applications onto the computer system—the process continues to block 354. This level of security is referred to as Level 3, when the process has very limited user rights. Secured versions of the applications that are most common are made available from the PEPS.

At block 354, the GUI functions the various applications available from the PEPS are enabled. In one embodiment, the system adds icons for the available secure applications to the desktop. At block 356, the user selects an application.

If the user selects the email client, at block 358, the secure email client is initialized. At block 360, the email filtering application is enabled. This provides a secure email client, including spam and virus filtering. The process then continues to block 336, where the vault explorer is initialized.

If the user selects the web browser, a secure web browser is initialized at block 362. At block 364, the cookie control and content filter are initialized. The cookie control ensures that all cookies are stored on the PEPS, and that no tracking cookies are enabled.

At block 366, the temp files are redirected to the PEPS, so that no temp files are stored on the system. In another embodiment, temp files for history and cache may be disabled. The process then continues to block 336, where the vault explorer is initialized.

Figure 3B:
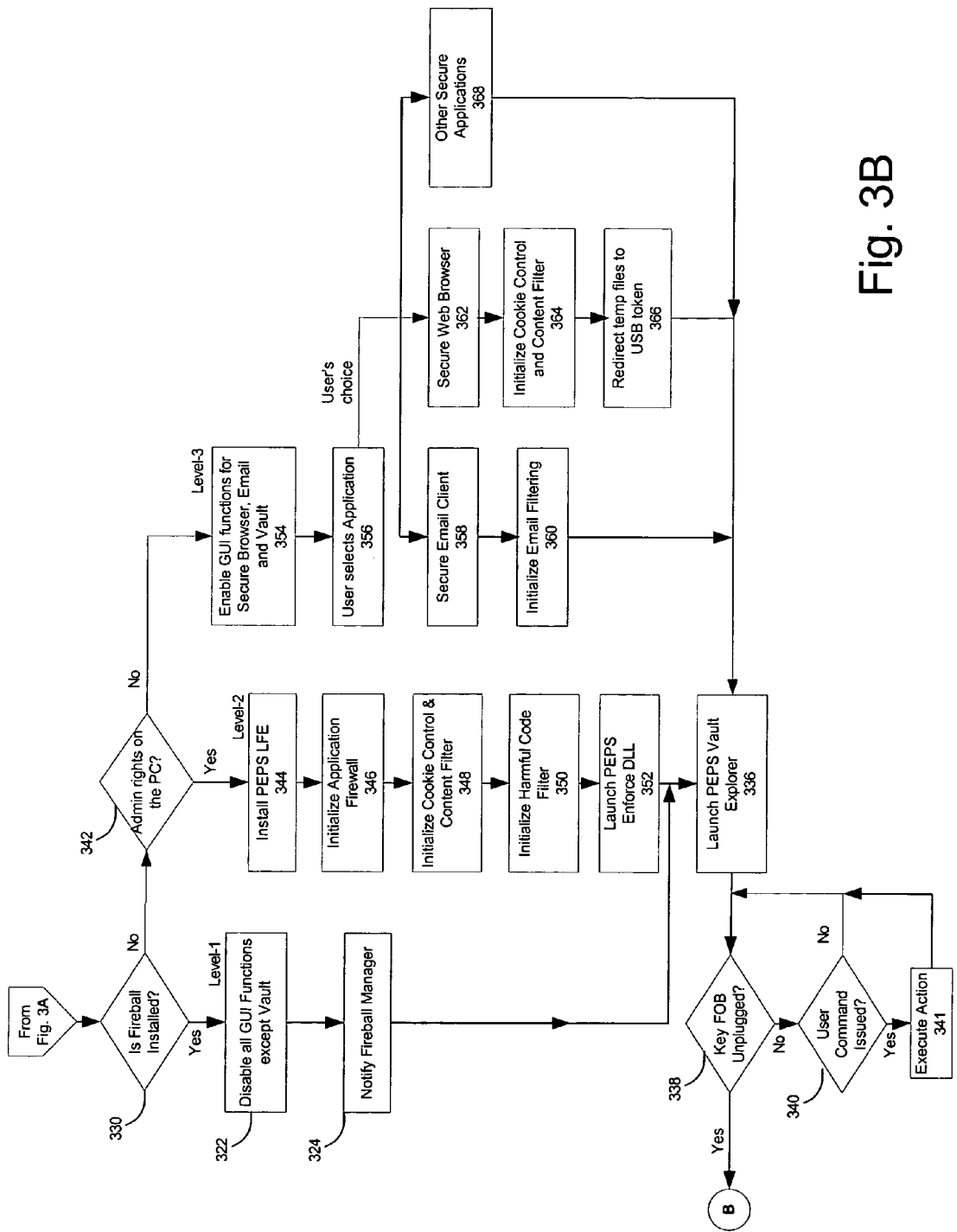
Figure 4:
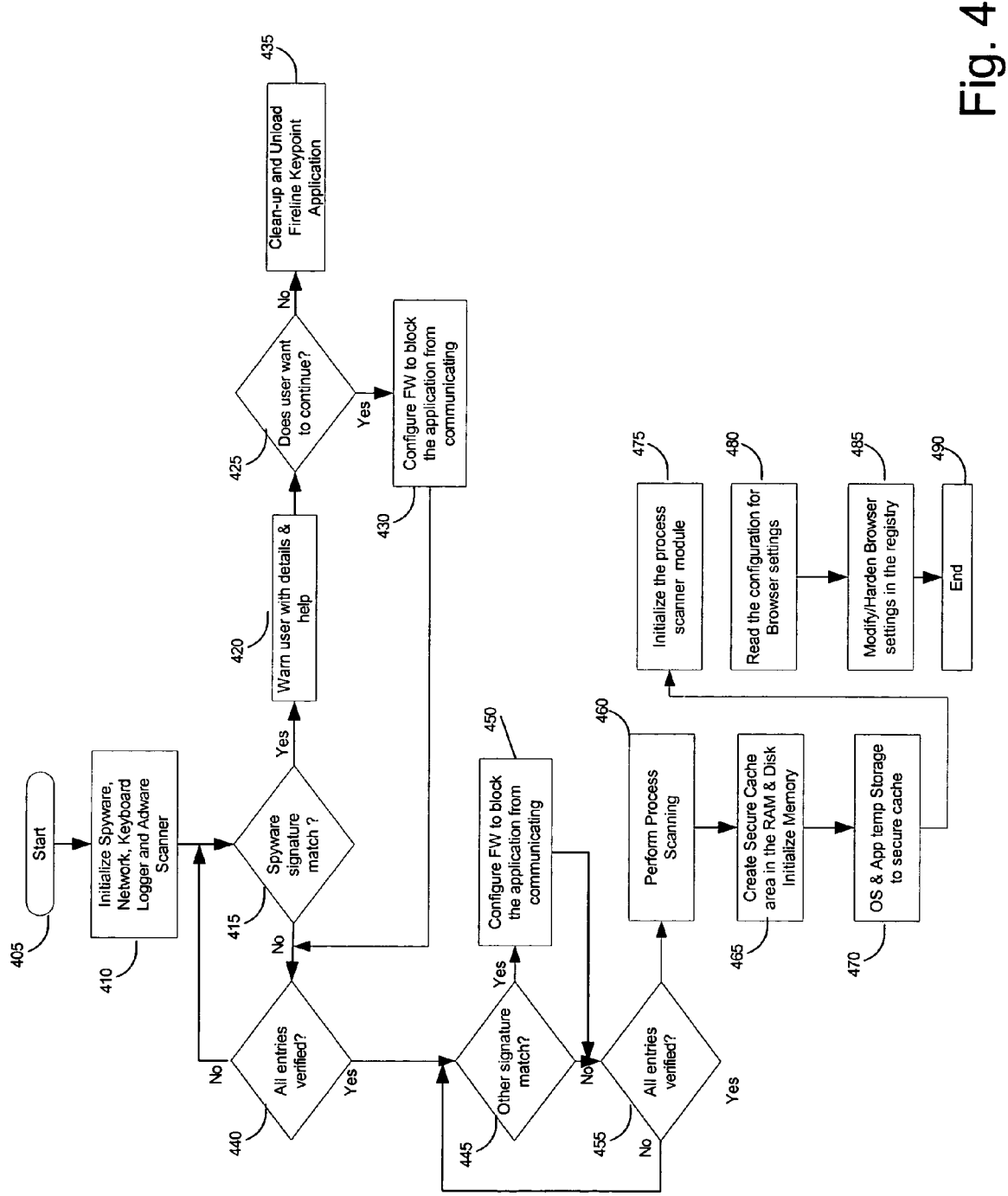
FIG. 4 is a flowchart of one embodiment of the spyware scanning engine.

FIG. 4 is a flowchart of one embodiment of the spyware scanning engine. The process starts at block 405. In one embodiment, the process corresponds to block 312 of FIG. 3.

At block 410, the spyware, network, keyboard logger, and adware scanner are initialized. The spyware, network, keyboard logger, and adware data is contained, in one embodiment in a database on the PEPS. In another embodiment, the database may be located on a remote server, accessed by the PEPS.

At block 415, the process determines whether there is a signature match between the spyware being tested and applications on the computer system. In one embodiment, the signature match tests the hard disk and registry entries. If there is a signature match, the process continues to block 420. At block 420, the user is warned with details and help. If the user does not wish to continue, the process continues to block 435, cleans up and unloads the PEPS, and terminates.

If the user wishes to continue (i.e. use the system in spite of this), the process continues to block 430. At block 430, the process configures the firewall to block the spyware application from communicating its data. In one embodiment, the process also blocks the spyware application from logging (i.e. temporarily storing) its data. In one embodiment, the process also blocks the spyware application from launching (blocking the application from even starting if it is coming into the system while PEPS system is protecting the system).

The process then continues to block 440, where it tests whether all entries in the list of spyware have been tested against. If not, the process returns to block 415, to test the next spyware signature. If all of the entries have been tested, the process continues to block 445.

At block 445, the process determines whether a signature in the keyboard logger, network, or adware listings is matched. In one embodiment, the match is with RAM data or processes on the computer system. If a match is found, the process continues to block 450, to configure the firewall to block the application from communicating. In one embodiment, the system further blocks these applications from storing their data. The process then continues to block 455, to determine whether all entries in the list of network, keyboard loggers, and adware have been tested. If not, the process returns to block 445, to test the next item's signature. If all of the applications have been successfully scanned, the process continues to block 460.

At block 460, process scanning is performed. This is described in more detail below with respect to FIG. 5.

At block 465, a secure cache area is created in the RAM and disk, and memory is initialized. The secure cache area is a designated area on the disk which will be used by the PEPS and related applications. This secure cache area will then be purged when the PEPS is removed.

At block 470, the temporary storage for the operating system and applications is redirected to the secure cache area.

At block 475, the process scanner module is initialized. This is described in more detail below.

At block 480, the configuration settings for the browser are reviewed. In one embodiment, if the secure browser provided by the PEPS is used, this set of steps may be skipped, and the process may continue directly to block 480, and end.

At block 485, the browser settings are modified/hardened. In one embodiment, the registry settings associated with the browser are modified/hardened. At block 490, the process stops.

Figure 5:
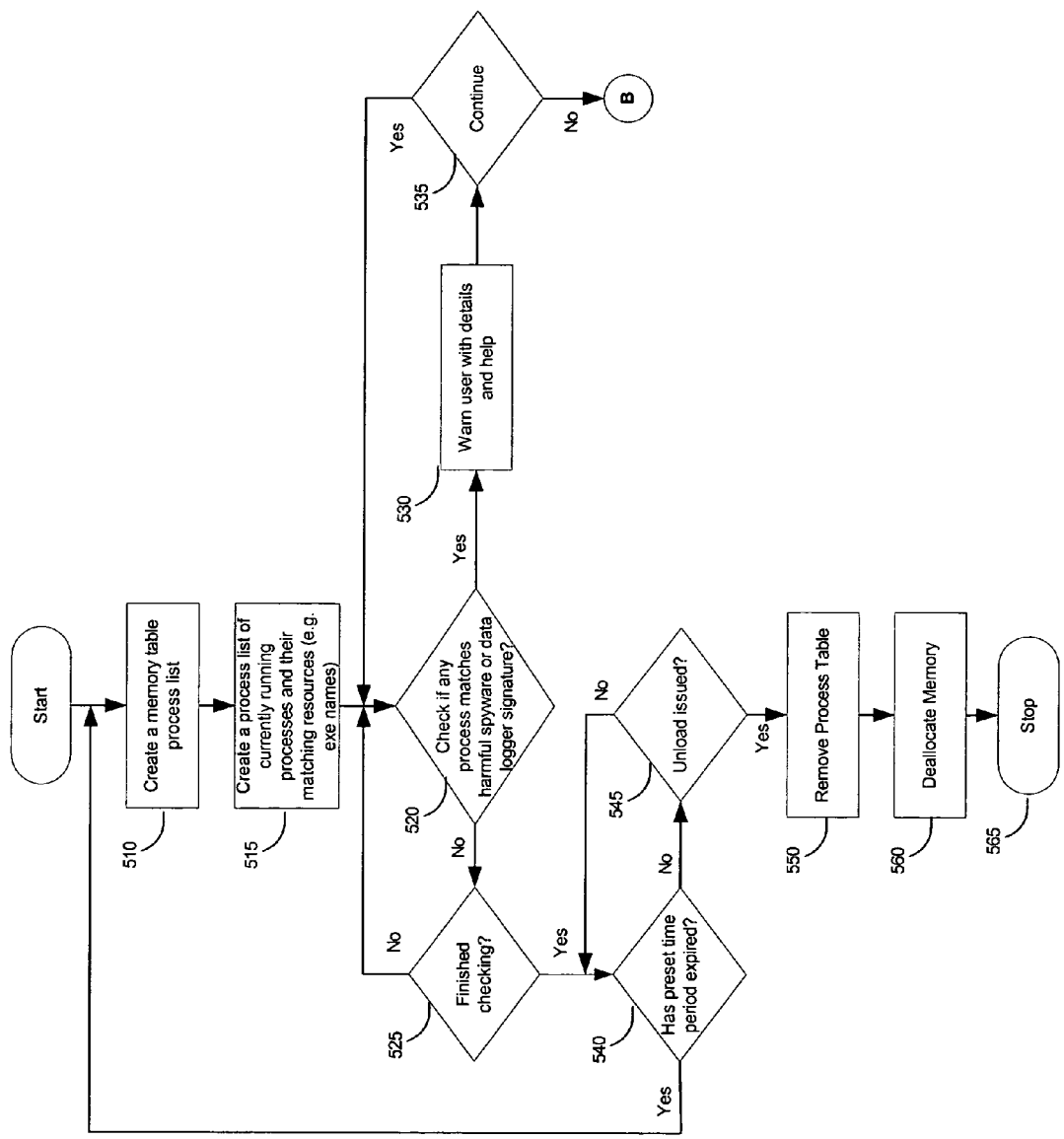
FIG. 5 is a flowchart of one embodiment of the process-scanning portion of the spyware scanning engine.

FIG. 5 is a flowchart of one embodiment of the process-scanning portion of the spyware scanning engine. The process starts at block 505. At block 510, a memory table is created for the process list.

At block 515; a process list of currently running processes and their matching resources is created. In one embodiment, the names of the executables, DLLs, and other running threads, and their associations is put into the process list.

At block 520, the process tests the first entry in the process list, to see whether the process matches any harmful spyware or data logger signature. In one embodiment, the comparison signatures are in the PEPS. In one embodiment, the PEPS is periodically updated with new signatures, when the PEPS is inserted into a secure computer. In another embodiment, the signatures are on a remote server, and are obtained by the system through a VPN (including SSL VPN) or similar connection. Such secure connections are known in the art. If the signatures do not match the currently tested process, the system continues to block 525, to determine whether all of the processes in the process list have been tested. If not, the system returns to block 520, to test the next process. If all of the processes have been tested, the system continues to block 540.

If, at block 520, the process was found to match a signature, at block 530, the user is warned. In one embodiment, the warning includes the identity of the harmful application, its risks, etc. The system then queries the user, whether he or she wishes to continue, at block 535. If the user wishes to continue, the system returns to block 520, to test for other matches. In one embodiment, the system attempts to block the harmful spyware/logger/network monitor/etc. If the user does not wish to continue, the system terminates, and unloads the PEPS. The unloading process is described in FIG. 9, below.

If, the system finishes checking all of the processes, at block 525, it determines, at block 540, whether the preset time period has elapsed. The preset time period is the time which the system waits before re-executing the process scanning. In one embodiment, the preset time period may be 30 seconds. Alternatively, the user may set the preset time period. In another embodiment, the process scanner may be triggered whenever a new process is activated.

If the time period has expired, the system returns to block 510, to restart the scan. Otherwise, the system continues to block 545. At block 545, the system determines whether an unload has been issued. If no unload has been issued—i.e. the PEPS has not been removed from the computer—the system returns to block 540. If an unload has been issued, the system continues to block 550.

At block 550, the system deletes the process table, and at block 560, the system de-allocates the memory. The process scanner then stops, at block 565.

Figure 6:
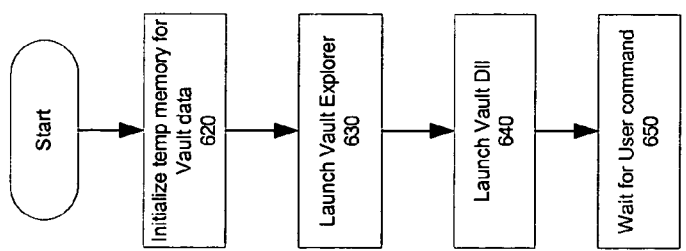
FIG. 6 is a flowchart of one embodiment of installing the vault on the PEPS.

FIG. 6 is a flowchart of one embodiment of installing the vault on the PEPS. This process corresponds to block 336, of FIG. 3.

At block 620, a temporary memory is initialized for Vault data. In one embodiment, the temporary memory initialization allocates the memory, and restricts memory access through the PEPS. This ensures that only the PEPS validated applications can access the memory. The memory, in one embodiment, is located on the hard drive of the system. In another embodiment, the memory may be located on the PEPS.

At block 630, the process launches the vault explorer. At block 640, the vault DLL is launched. This enables the vault. The process then waits for a user command, at block 650.

Figure 7:
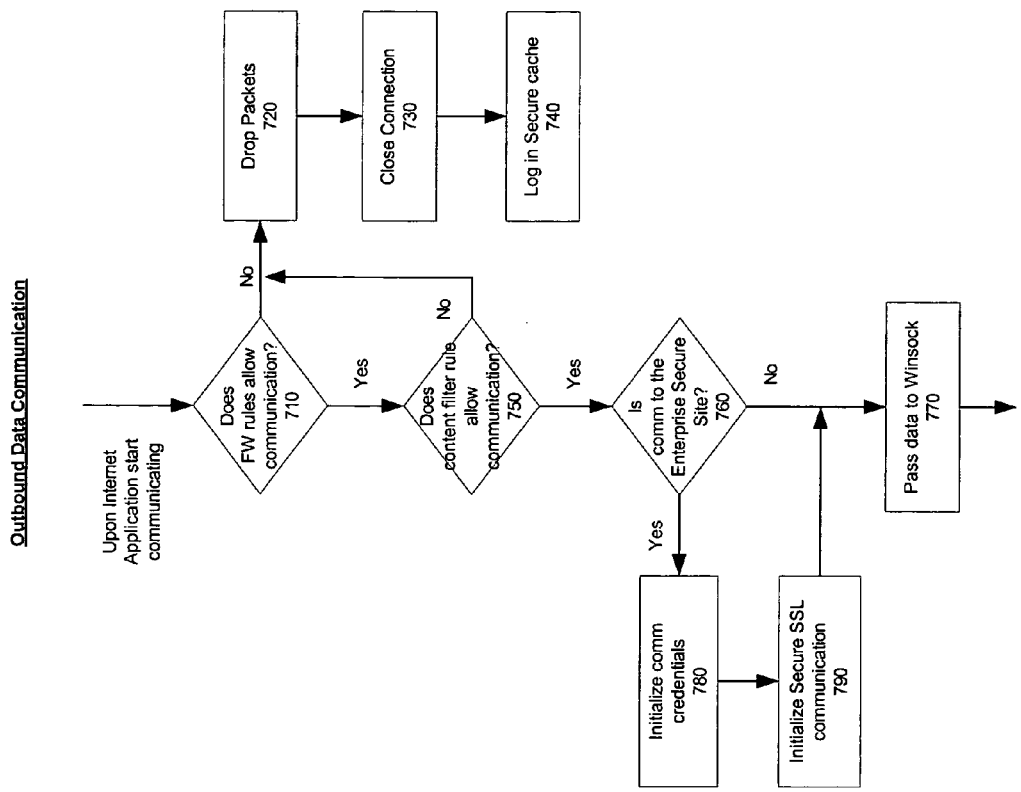
FIG. 7 is a flowchart of one embodiment of outbound data communication processing.

FIG. 7 is a flowchart of one embodiment of outbound data communication processing. The process, at block 710, determines whether the firewall rules allow the communication. The firewall rules specify which types of communication are acceptable. If the firewall rules do not permit the communication, the process continues to block 720. At block 720, the packets are dropped, the connection is closed (block 730), and the attempt is logged in the secure cache (block 740). In one embodiment, the data in the secure cache is uploaded to the server, once the PEPS is coupled to a secure computer. This data is then used, in one embodiment, to update the list of spyware, logging, and other dangerous applications.

If the firewall permits the communication, at block 710, the process continues to block 750. At block 750, the process determines whether the content filter permits the communication. In one embodiment, a content filter may filter objectionable communication. If the content filter indicates that the communication should be prohibited, the process continues to block 720, to drop the packets, close the connection, and log the communications attempt.

If the content filter permits the communication, the process continues to block 760.

At block 760, the process determines whether the communication is to the enterprise secure site. If it is not, the process continues to block 770, and the data is passed to the Winsock.

If the communication is to the enterprise secure site, the process continues to block 780. At block 780, the comm credentials are initialized. At block 790, secure SSL communication is initialized. The data is then passed to the Winsock, at block 770. This ensures that only screened communications are permitted.

Figure 8:
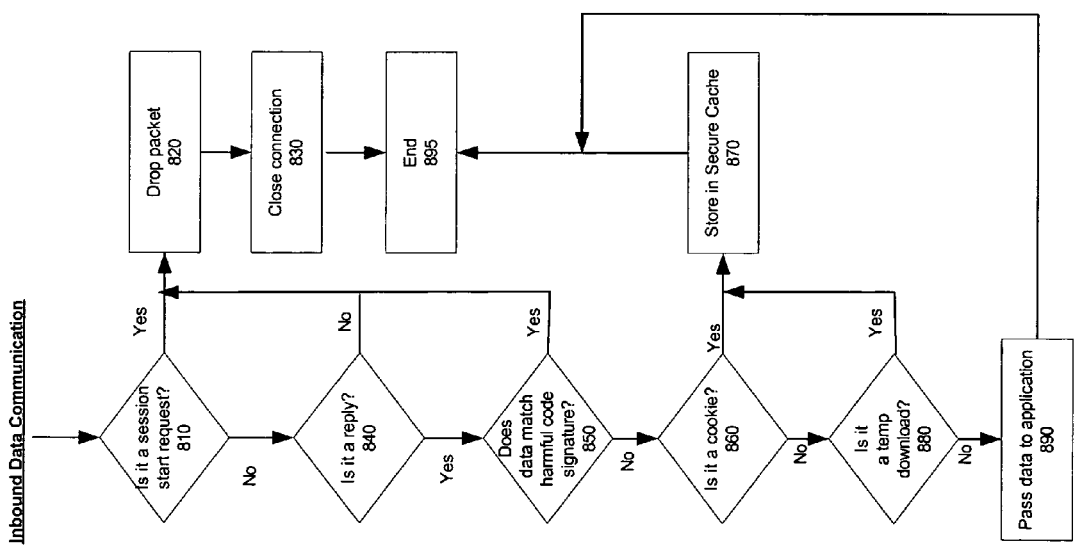
FIG. 8 is a flowchart of one embodiment of inbound data communication processing.

FIG. 8 is a flowchart of one embodiment of inbound data communication processing. The process starts when an inbound data packet is received.

At block 810, the process determines whether the data is a session start request. If so, the process continues to block 820, and the packet is dropped. The connection is then closed, at block 830. The process then ends at block 895. The present process, for security reasons, will not permit session start requests from external agents. Rather, the user's system has to request the session start.

If the packet was not a session start request, at block 810, the process continues to block 840. At block 840, the process determines whether the data is a reply to a data packet from the user. If it is not a reply, the process continues to block 820, and drops the packet, closes the connection, and ends. The present process, for security reasons, will not permit any communication that was not initiated by the user.

If the packet was a reply, at block 840, the process continues to block 850.

At block 850, the process determines whether data matches a harmful code signature. Harmful code signature indicates that the data being sent is a virus, a harmful application, or not permitted for another reason. If the data matches a harmful code signature, the process continues to block 820, to drop the packet, close the connection, and end.

If the packet does not match any harmful code signatures, the process continues to block 860.

At block 860, the process determines whether the packet is a cookie, or cookie component. If so, the data is stored in the secure cache, at block 870, described above. The process then ends at block 895.

If the packet is not a cookie, the process continues to block 880. At block 880, the process the process determines whether the packet is part of a temporary download. If so, it is stored in the secure cache, at block 870.

If the packet is not a temporary download, the data is passed to the applicant at block 890. The process then ends at block 895.

Figure 9:
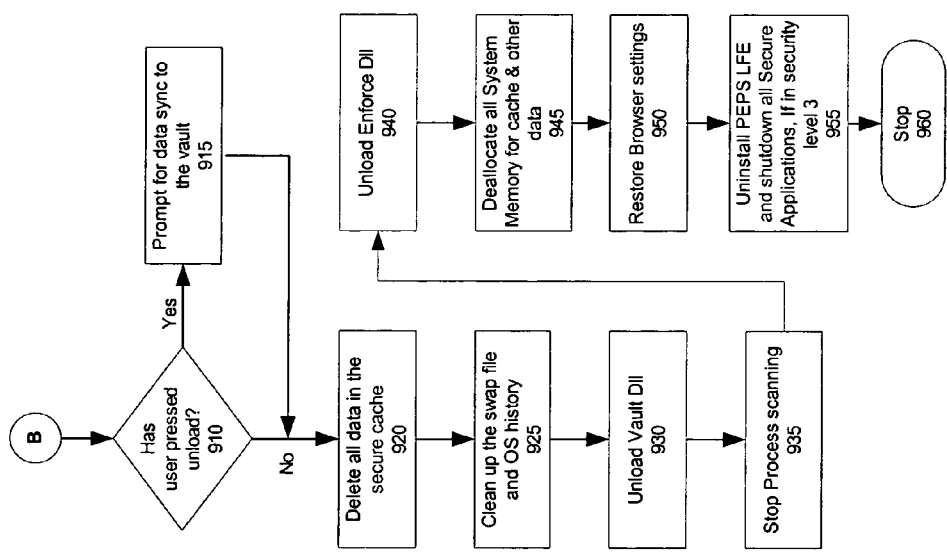
FIG. 9 is a flowchart of one embodiment of the unload process.

FIG. 9 is a flowchart of one embodiment of the unload process. The process starts when the user presses "unload" or removes the PEPS.

At block 910, the process determines whether the unload was triggered by the user pressing unload. If so, the PEPS is still connected to the computing system. The process therefore continues to block 915. At block 915, the system prompts for data synchronization to the vault. The data synchronization moves any newly created data on the computer to the PEPS system memory. The process then continues to block 920. If the user did not press unload, and the PEPS was removed, the process continues directly to block 920.

At block 920, all of the data in the secure cache is deleted.

At block 925, the swap file and history files created during the use of the system are cleaned up. In one embodiment, instead of simply removing the file name, as standard deletion does, the deletion overwrites the data with new data, to ensure that it cannot be recovered.

At block 930, the vault DLL is unloaded.

At block 935, the process scanning is stopped.

At block 940, the DLL associated with the enforcement of the firewall rules and information secure are unloaded.

At block 945, the system memory that was used is de-allocated. This frees up the memory that was previously used for the cache, as well as any applications that were running from the PEPS.

At block 950, the browser settings are restored. In one embodiment, when browser settings are altered during installation, the original browser settings are saved in a "prior state" file. This is used to restore the browser to its previous state.

At block 955, the Enforce DLL is uninstalled, and any secure applications that were running on the system are uninstalled. The process then ends at block 960.

Figure 10A:
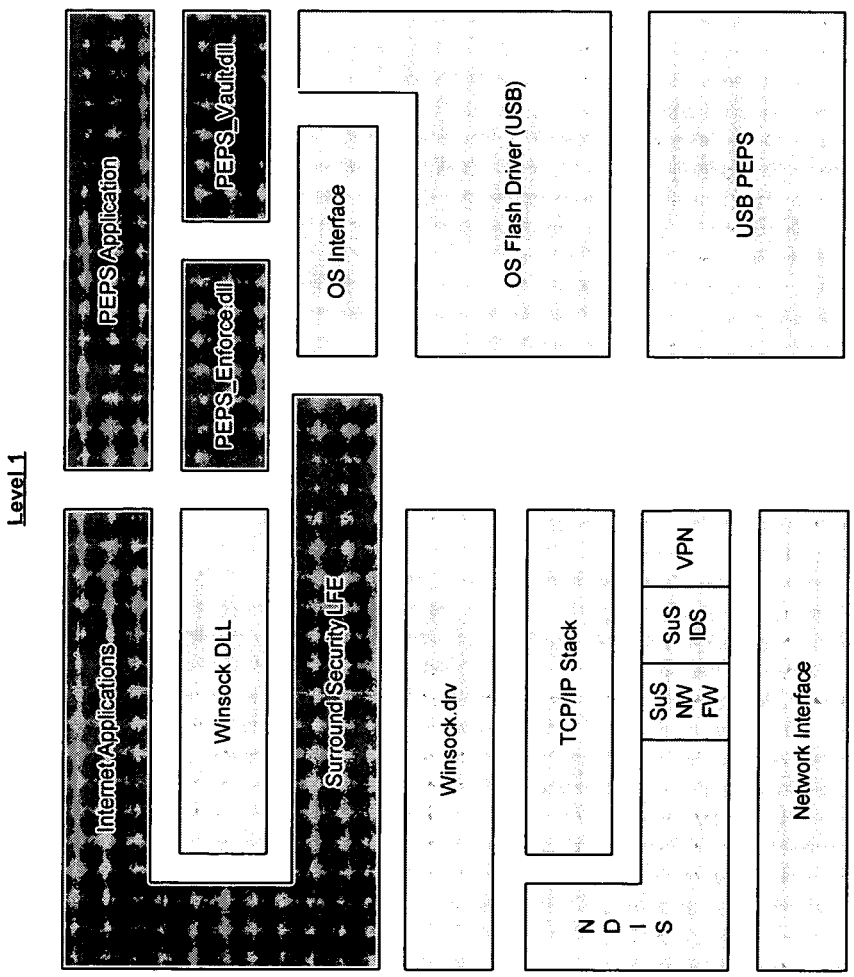
FIGS. 10A-C are block diagrams illustrating where the protection takes place in the OS and communication stack.
Figure 10B:
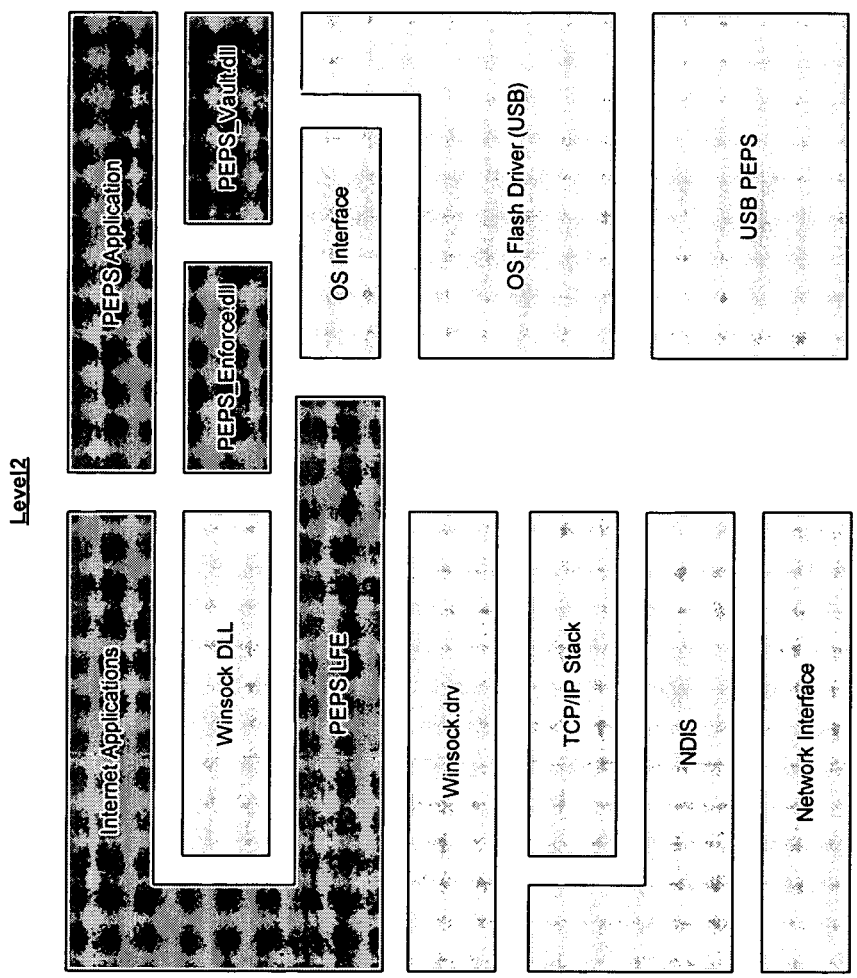
Figure 10C:
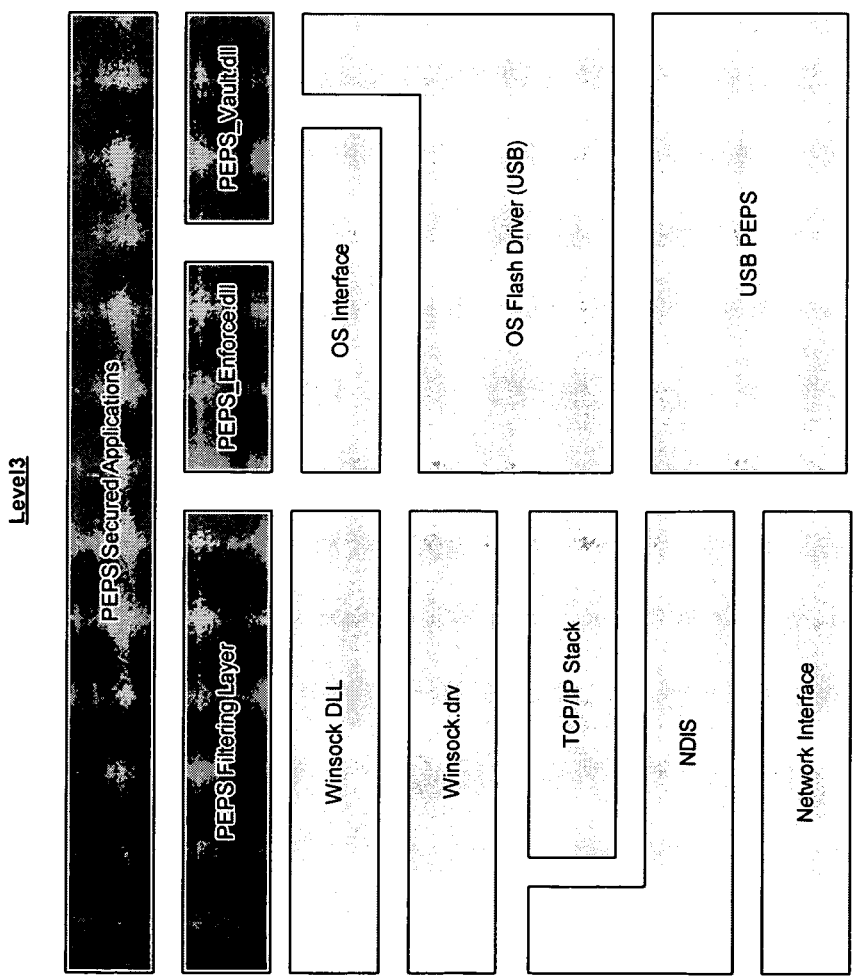

FIGS. 10A-C are block diagrams illustrating where the protection takes place in the OS and communication stack. FIG. 10A illustrates the Level-1 protection, which is available if the surround security is preinstalled on the computer system.

The portions of the computer system that are unchanged include the Winsock DLL, OS interface, OS flash driver, TCP/IP stack, Winsock driver, and network interface. At Level-1, shown in FIG. 10A, the Internet applications include the surround security Enforce DLL. The PEPS applications, and associated DLLs are also resident on the computer system. The Vault also has a DLL associated with it. The PEPS itself, of course, is coupled to the computer system. The network driver interface specification (NDIS) includes a network firewall, an intrusion detection system, and a VPN connection. Note that these elements are part of the surround security system, not of the PEPS. The elements added by the PEPS are the applications and associated DLLs, and the vault and associated DLL.

In comparison, FIG. 10B illustrates the computer system at Level-2, a computer system with no pre-installed elements, but with administrative access. As can be seen, the system is similar to that of FIG. 10A. However, the NDIS does not include any elements. Also, note that the LFE is from the PEPS, since there is no preinstalled surround security to take advantage of.

Compare this with Level-3 security, shown in FIG. 10C. This is available for systems that do not provide preinstalled surround security, and do not provide administrative access.

The system includes PEPS secured applications, described above, as well as the associated DLL, and Vault DLL. The system further includes a PEPS filtering layer, which replaces the LFE.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A portable end-point security (PEPS) system designed to be plugged into a computing system, comprising:
   a PEPS processor having a memory operatively coupled thereto, the memory having stored therein instructions which when executed by the PEPS processor causes:
   an automatic loader to automatically trigger loading of the PEPS system when the PEPS system is being plugged into the computing system, the loading performed in cooperation with a primary operating system installed on the computing system;
   the PEPS system including a malicious software detector to scan a main memory of the computing system for malicious software;
   wherein the malicious software detector performs a scan of the main memory of the computing system following triggering of the PEPS system by the automatic loader by comparing existing data in main memory of the computing system with indicia of malicious software, wherein said scan performed by the malicious software detector includes the malicious software detector checking processes that are currently running on the computing system during said scan;
   wherein the instructions which when executed by the PEPS processor causes a detector to determine what level of security should be installed on the computing system;
   wherein the level of security depends on a presence of a security system already installed on the computing system and administrative privileges available on the computing system;
   wherein the security system permits the computer system to be secure; and
   wherein the PEPS system is plugged into the computing system via a computing system interface.

2. The PEPS system of claim 1, further comprising instructions which when executed by the PEPS processor causes:
   a cache creator to create a secure cache to store all temporary files created during the use of the computing system;
   wherein the secure cache stores: cookies, persistent cookies, downloaded data, and email.

3. The PEPS system of claim 1, further comprising:
   signature files for indicia of malicious software; and
   the malicious software detector to compare processes and applications on the computing system with the signature files.

4. The PEPS system of claim 1, wherein the malicious software detector is run upon initialization of the PEPS system.

5. The PEPS system of claim 1, wherein the malicious software comprises one or more of the following: spyware, key logger, process logger, network logger, viruses, and adware.

6. The PEPS system of claim 1, further comprising instructions which when executed by the PEPS processor causes:
   an application firewall to screen communications between the computing system and a network.

7. The PEPS system of claim 6, wherein the application firewall is further to ensure that malicious software cannot be used to communicate user data.

8. The PEPS system of claim 1, further comprising instructions which when executed by the PEPS processor causes:
   an application blocker to prevent launching of malicious software applications, once the PEPS system is active.

9. The PEPS system of claim 1, further comprising instructions which when executed by the PEPS processor causes:
   a data vault to be generated within the PEPS system;
   the data vault to store data securely;
   wherein the data vault is accessible only to an authenticated user.

10. The PEPS system of claim 1 further comprising instructions which when executed by the PEPS processor causes:
    the PEPS system to perform user authentication with the computing system or a server;
    wherein the user authentication comprises one or more of the following: a password, a smart card, a challenge/response token and a biometric authentication.

11. The PEPS system of claim 1, further comprising instructions which when executed by the PEPS processor causes:
    using the PEPS system for authentication within a Windows Operating System.

12. The PEPS system of claim 1, further comprising instructions which when executed by the PEPS processor causes:
    secure applications to run from the PEPS system.

13. The PEPS system of claim 1, further comprising instructions which when executed by the PEPS processor causes:
    an uninstall function to automatically remove traces of the PEPS system from the computing system, when the user discontinues use of the computing system.

14. The PEPS system of claim 13, wherein the uninstall function is triggered by the removal of the PEPS system from the computing system.

15. The PEPS system of claim 1, further comprising instructions which when executed by the PEPS processor causes:
    a communicator to communicate with a server to update the PEPS system.

16. The PEPS system of claim 15, wherein the PEPS system downloads one or more of the following: policy, product updates, vault recovery data, and malicious software signature updates.

17. The PEPS system of claim 1 wherein the PEPS processor operates with the computing system.

18. A computer program product embodied in a portable end-point security (PEPS) device comprising instructions which when executed by a PEPS processor causes the PEPS processor to:

automatically trigger the PEPS device to load a PEPS system into a main memory of a computing system when the PEPS device is plugged into the computing system, the PEPS system including an operatively loaded malicious software detector, the loading performed by an automatic loader in cooperation with a primary operating system installed on the computing system;

cause the main memory of the computing system to be scanned for malicious software with the operatively loaded malicious software detector;

wherein the malicious software detector performs a scan of the main memory of the computing system following triggering of the PEPS system by the automatic loader by comparing existing data in main memory of the computing system with indicia of malicious software, wherein said scan performed by the malicious software detector includes the malicious software detector checking processes that are currently running on the computing system during said scan;

wherein said instructions which when executed by the PEPS processor causes a detector to determine what level of security should be installed on the computing system;

wherein the level of security depends on a presence of a security system already installed on the computing system and administrative privileges available on the computing system;

wherein the security system permits the computer system to be secure; and wherein the PEPS system is plugged into the computing system via a computing system interface.

19. The computer program product of claim 18 further comprising instructions which when executed by the PEPS processor causes the PEPS processor to:

operatively load an application blocker into the main memory of the computing system;

cause the computing system to prevent any malicious software applications identified by the malicious software detector from launching with the application blocker.

20. The computer program product of claim 18 further comprising instructions which when executed by the PEPS processor causes the PEPS processor to:

operatively load a cache creator into the main memory of the computing system;

cause the computing system to create a secure cache with the cache creator to store all temporary files created during the use of the computing system.

21. The computer program product of claim 18 further comprising instructions which when executed by the PEPS processor causes the PEPS processor to:

operatively load an application firewall into the main memory of the computing system;

cause the computing system to screen communications between the computing system and a network with the application firewall.

22. The computer program product of claim 21 wherein the application firewall ensures that malicious software cannot be used to communicate user data.

23. The computer program product of claim 18 further comprising instructions which when executed by the PEPS processor causes the PEPS processor to:

perform user authentication with the computing system or a server;

wherein the user authentication comprises one or more of the following: a password, a smart card, a challenge/response token and a biometric authentication.

24. The computer program product of claim 18 wherein the PEPS processor operates with the computing system.

\* \* \* \* \*